Aug. 22, 1933.  E. RODOLAUSSE  1,923,231
CONTROL AND SAFETY DEVICE FOR RAILWAYS AND TRAMWAYS
Filed Aug. 12, 1932   5 Sheets-Sheet 1

Inventor:
Eloi Rodolausse
BY  Attorney:

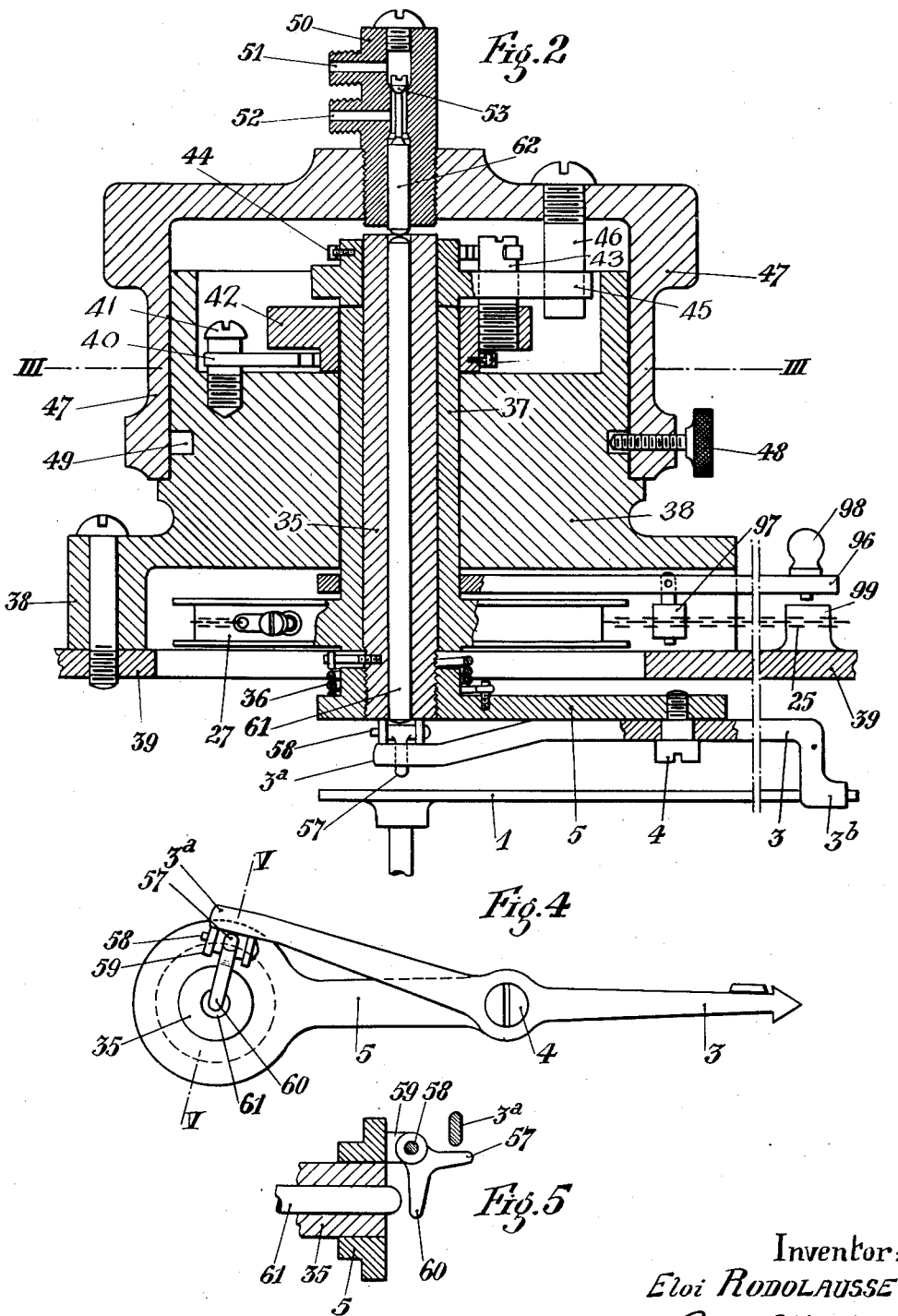

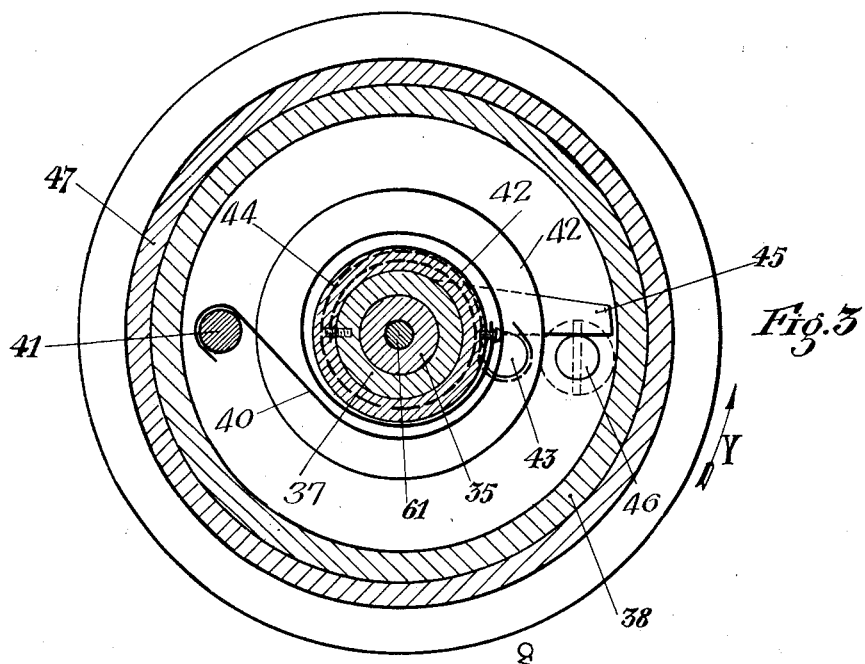
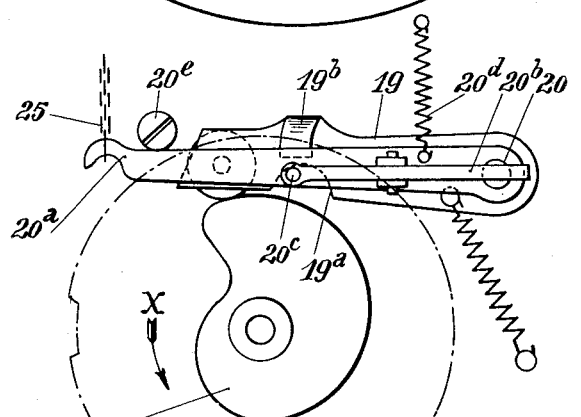
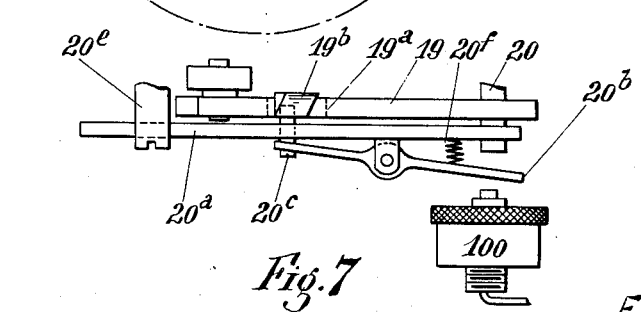

Aug. 22, 1933.   E. RODOLAUSSE   1,923,231
CONTROL AND SAFETY DEVICE FOR RAILWAYS AND TRAMWAYS
Filed Aug. 12, 1932   5 Sheets-Sheet 4
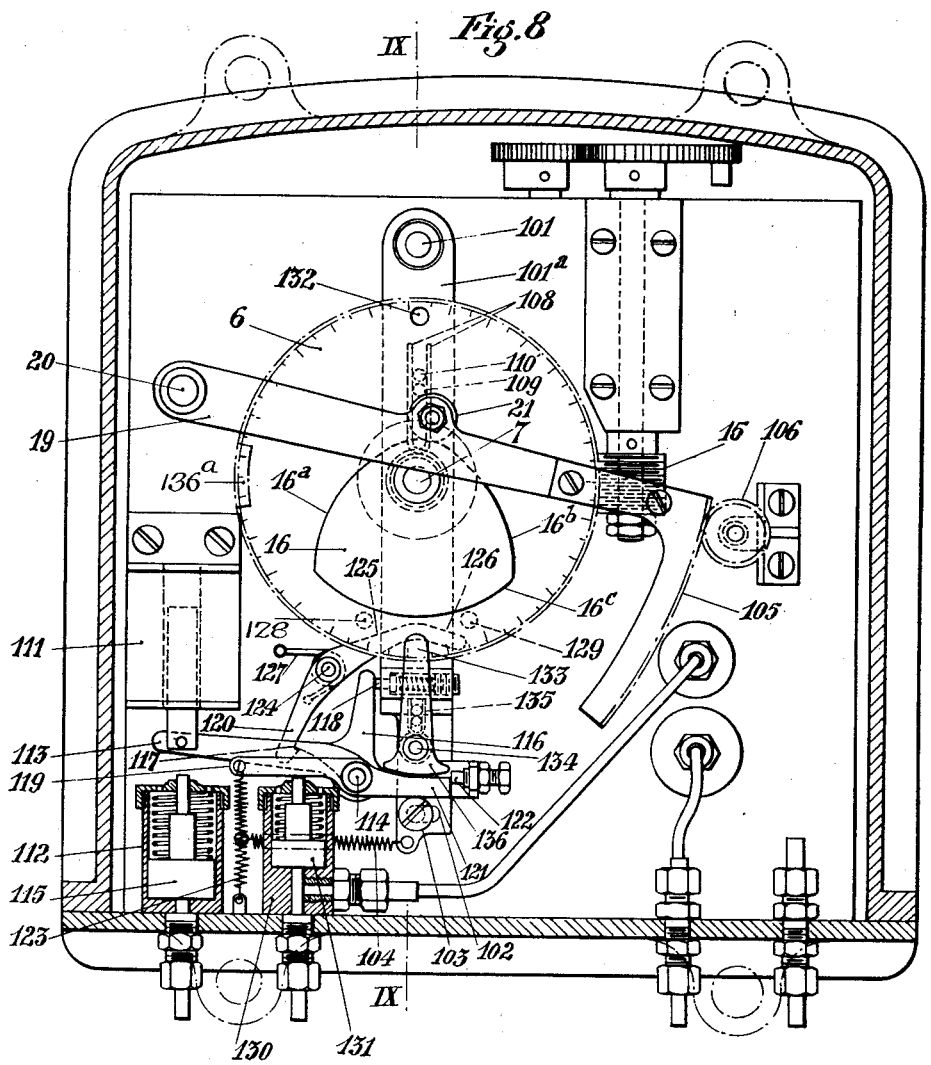
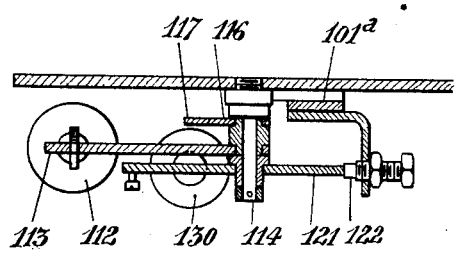
Inventor:
Eloi RODOLAUSSE
BY
Attorney:

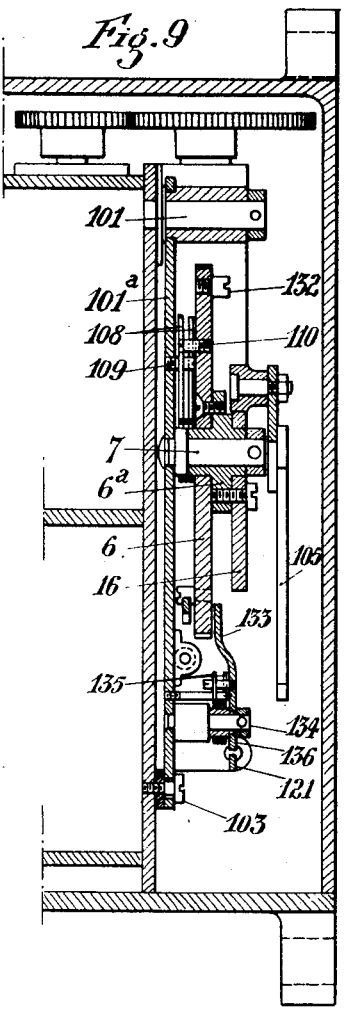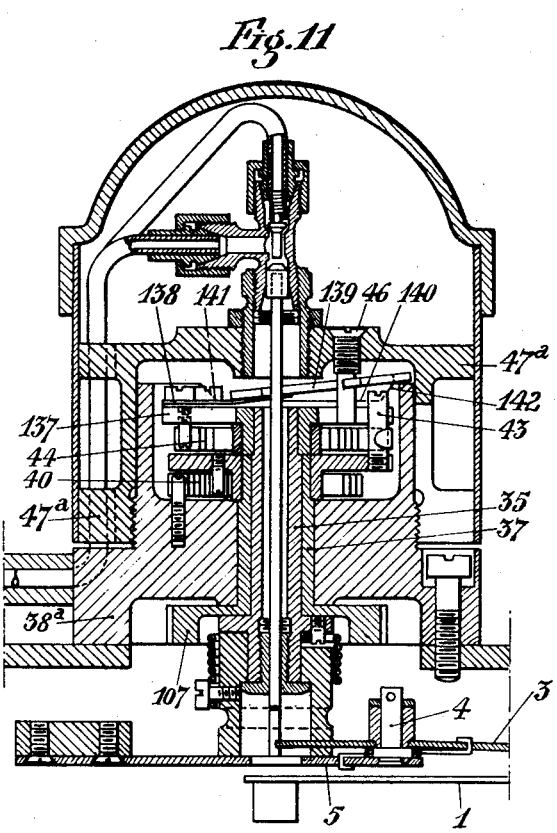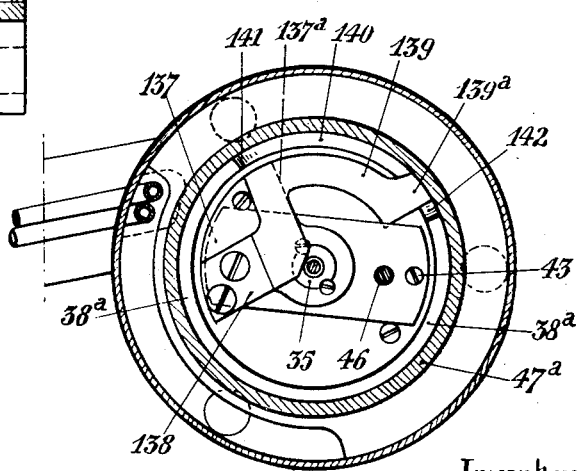

Patented Aug. 22, 1933

1,923,231

UNITED STATES PATENT OFFICE 1,923,231

CONTROL AND SAFETY DEVICE FOR RAILWAYS AND TRAMWAYS

Eloi Rodolausse, Saint-Antonin in Tarn-et-Garonne, France

Application August 12, 1932, Serial No. 628,588, and in France August 25, 1931

13 Claims. (Cl. 246—182)

My present invention has for its object an apparatus constructed in view of ensuring the control of the running of trains, and the automatic functioning of the brakes in case of default of the driver in the observance of the signals, of the speed limit, of the slowing down in dangerous parts of the line, of the lack of pressure in the main pipe of the brakes, and of the normal application of the brakes for stopping over the prescribed distance.

The apparatus according to this invention comprises two dial-hands, pivotally mounted on two distinct axles on the same axis: the first hand, called speed-hand, is operated by a revolving member of the locomotive and moves in front of a dial in such a manner as to indicate the speed of a train in any point of its track—the second hand, called controlling hand being movable by hand in front of any graduation of the same dial to indicate the maximum permissible speed of the train, and capable of being brought automatically towards the zero of the dial, either pneumatically in case of depression in the main canalization of the brakes operating device, to indicate the maximum speed corresponding to the depression, or mechanically by the action of a chronometrical tachometer by the passage of the train past a stop signal connected to a track device, the brakes being automatically put in action by the contact between the two said hands.

The apparatus can receive various forms of realization; by way of example, two preferred forms of realization have been illustrated in the appended drawings, together with various modifications of some parts. In the drawings:

Fig. 2 is a horizontal section on a larger scale according to line II—II of Fig. 1.

Fig. 3 is a vertical section according to line III—III on Fig. 2.

Fig. 4 shows in detail the controlling-hand.

Fig. 5 is a fragmentary section according to line V—V on Fig. 4.

Figs. 6 and 7 show a modification of the optional neutralization device.

Fig. 8 is a front view of a second form of the apparatus.

Fig. 9 is a section along line IX—IX on Fig. 8.

Fig. 10 is a horizontal fragmentary section showing the engaging and locking levers of Fig. 8.

Figs. 11 and 12 show respectively in horizontal section and in partial plan view the mechanism connected to the controlling hand for the form according to Figs. 8 to 10.

Figure 1:
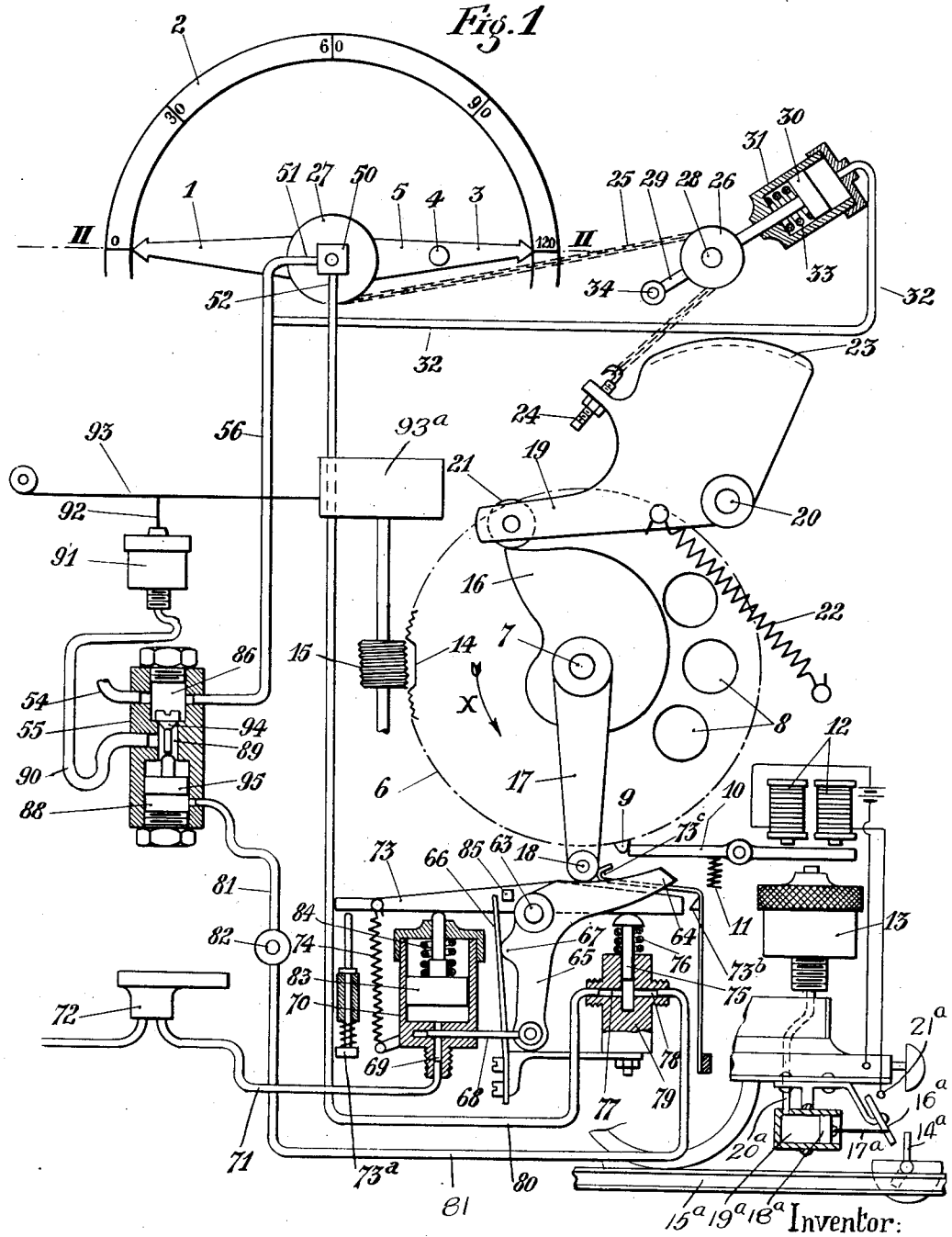
Fig. 1 is a schematical view illustrating the whole apparatus of the invention in the first form of realization thereof.

Just as it is schematically illustrated by Fig. 1, the apparatus essentially comprises two dial-hands, one of which, 1, is connected by suitable transmission means to a rotating member of the locomotive in such a manner to be operated by same, and to be moved, while the train is running, in front of a dial 2 graduated from 0 to 120 kilometers to indicate the speed of the train whilst running. This first hand will be called the "speed-hand".

The second hand 3, pivoted in 4 on a hand-support 5 displaceable angularly around a supporting pivot which can be the same as the pivot of hand 1, or be situated in line with said pivot of needle 1, is disposed in such a manner as to be able:

(a) When the train leaves, to be placed by hand in front of the graduation of dial 2 corresponding to the maximum speed allowed for the train, (b) While the train is running, to be brought back automatically towards the zero of the dial: either when the train passes a stop signal, or when the pressure in the brake pipes falls under normal.

This second hand, called "control-hand" comes therefore, when it goes back towards zero, nearer to hand 1, and indicates the necessity for slackening speed in dangerous parts of the line, the lack of pressure in the brake pipes, the necessity for the normal application of the brakes in order to stop in the prescribed distance. This control hand is also mounted in such a manner that when it reaches, in case of default of the driver, the speed hand, it pivots on member 5 which carries it and puts the brakes in action as will be explained hereafter.

In Fig. 1, which illustrates schematically the various mechanical devices which the apparatus comprises, 6 represents a worm-wheel freely rotatable on a shaft 7, and having on one side some openings 8 which make the wheel lighter on that side, and therefore the wheel has a tendency to turn in the direction of arrow X.

This worm-wheel is, in normal running, held in the stop position illustrated, by a stop projection 9, abutting against the end of a lever 10 normally brought into the path of said stop projection 9 by a spring 11, but capable of being thrown out of stop position by means of a track device disposed on the line and capable of energizing an electro-magnet 12 or a pneumatic device 13, operating the lever.

Track apparatus for operating a mechanism on the train are well known in the art and may consist, for instance, of a lever 14a pivotally mounted with friction near the rail 15a. When the lever 14a is in the upright position as illustrated, at the passing of the locomotive it will knock against a member 16a pivotally mounted on the locomotive and which is connected by a rod 17a to a piston 18a movable in a cylinder 19a communicating by a pipe 20a with the pneumatic device 13. The action of the piston 18a will operate the device 13 to liberate lever 10, while simultaneously the member 16a will produce an electrical contact 21a energizing electromagnet 12. The lever 14a will then be forced back.

Wheel 6 comprises, on the side opposite to the openings 8, a portion 14 of the periphery thereof without teeth, constituted by a notch or otherwise, and which in the normal position is in front of the worm 15 rotated by the chronometrical tachometer 93a of the engine.

It will be understood, from the foregoing, that the disengagement of wheel 6, by disengagement of the stop projection 9, will have for effect to engage the teeth of the worm wheel with the worm, and to rotate said wheel 6, which will then perform a complete revolution and stop by abutting again by projection 9 against lever 10.

The worm wheel 6 also carries rigidly secured a cam 16 and a lever 17 provided at its free end with a roller 18.

A lever 19, pivotally mounted on a fixed pivot 20, carries at its free end a roller 21 that a spring 22 will maintain applied against the cam 16. This lever 19 is made integral with a sector shaped member having a groove 23 and to which is attached by an adjusting screw 24, a flexible tie 25, which may be a chain or the like, and which comes into engagement with the groove 23, passes over a roller 26, and its attached by its other end to a drum 27, Fig. 2, connected as will be explained hereafter to the hand support 5 carrying on pivot 4, the control hand 3.

The intermediate roller 26 of the chain is freely rotatable on an axle 28 secured on a rod 29 of a piston 30 movable in a cylinder 31 which is connected by a pipe 32 to the main canalization of the brakes, and which contains a spring 33, mounted on piston 30 in such a manner to be compressed by the piston 30, as shown in Fig. 1, when the pressure in the said main canalization is normal, and in these conditions to bring the rod 29 into contact with a fixed stop 34. When, for some reason or other, the pressure in the main canalization of the brakes and consequently in the cylinder 31 falls, the spring 33 expands and pushes the piston 30 which pulls the roller 26 determining as will be explained a certain angular displacement of the hand support 5, and bringing same back towards the zero of the dial 2, up to a point corresponding to the pressure existing in the canalization of the brakes.

The hand support 5 is, as visible on Fig. 2 mounted in a suitably threaded end of a tubular axle 35 to which the control-hand support 5 is connected by means of a spring 36, coiled around the pivot of the control-hand support and attached, by one of its ends to the said control-hand support 5, and by the other to the tubular axle 35.

On the said axle 35 is mounted with lubricated friction a sleeve 37 which is integral with or secured to the drum 27 on which is attached the end of the chain 25.

This sleeve 37 which rotates inside a body 38 secured on a transverse bar 39 mounted in front of the dial of the chronometrical tachometer, is connected to the body 38 by means of a spiral spring 40, attached, by one end to a screw 41, screwed on the body 38, and by the other end to a disk 42 secured on the sleeve 37, Fig. 2.

The disk 42 carries a pin 43 to which is attached another spiral spring 44, coiled around and attached by its other end to the hub of an arm 45 which is mounted on the tubular axle and is normally maintained in contact with a stop finger 46 mounted in a bell-shaped member 47.

This bell-shaped member 47 is adjusted with lubricated friction on the body 38 and is provided with a milled-head screw 48, engaged in a groove 49, formed in the said body, which arrangement makes it possible to displace the bell-shaped member angularly in relation to the body 38 and to bring at will the control hand 3 on any graduation of the dial 2.

The bell-shaped member is locked in any desired position of the hand 3 by screwing the screw 48 in the bottom of the groove 49, and when it is moved in the direction of the arrow Y, Fig. 3, it displaces the handle 3 towards the zero of the dial 2, against the action of the spring 44, through the finger 46 and the arm 45.

During displacement of the bell-shaped member in the direction opposite to the arrow Y, the arm 45, under the action of the spring 44, follows the finger 46.

Screwed in the bottom of the bell-shaped member 47, and rotatable therein with friction is a cup 50, provided with two tubular extensions or nozzles 51 and 52, and containing a valve 53 disposed so as to normally interrupt communication between the two tubular extensions as in Fig. 2, but to allow said communication under abnormal conditions.

The valve 53 is maintained in the closed position as shown in Fig. 2, by the pressure reigning in the main pipe or canalization 54 of the brakes, which pipe is branched on the body 55 of a valve, which valve works as an auxiliary gear, and is connected to the nozzle 51 by a pipe 56 which as shown in Fig. 1, is connected, by pipe 32 to the cylinder 31.

The same valve 53 is opened, as will be explained hereafter, and allows communication between the nozzles 51 and 52 when the control hand 3 comes against the speed hand 1, the said control hand 3 pivoting on its pivot 4, to contact by its end 3a, (Figs. 2, 4 and 5,) with one of the branches 57 of a double armed lever. This lever, which pivots at 58 in a shell 59 secured on the hand support 5 carrying the hand 3, is in contact by its other arm 60, with a rod 61 slidably mounted inside the tubular axle 35, and contacting against a pusher rod 62 on which rests the valve rod 53 (Fig. 2).

The above described devices are combined with two levers mounted on a common axle 63 (Fig. 1) around which they are movable angularly and independently.

The first of these two levers comprises two arms 64 and 65 and is urged, by a spring 66 bearing against a boss 67 of one of the arms, to bear against the roller 18, by its second arm 64, when the worm-wheel 6 is stopped.

In this stopped position, the arm 65 shuts through a plug rod 68 which it carries, the admission opening 69 of an air pump 70 connected by a tube 71 to the exhaust of the brake operating cock, operable by the driver.

The second lever 73, which is mounted on the axle 63 with the above described lever 64—65, is by one of its ends under the action of a spring 74 which has tendency to raise the other end of said lever 73 and thus to allow a plug 75 operated by a spring 76 to uncover simultaneously two openings 77 and 78 provided in a body 79.

These two openings are connected: the first 77 to the nozzle 52 of the cup member 50, by a pipe 80, and the other 78 to the auxiliary gear valve 55 by another pipe 81, in which is mounted a suitable plug 82 which can be hand-operated by the driver, to shut off communication from the body 79 to the valve 55.

The pneumatic pump 70, connected on the exhaust side of the brake cock 72, comprises a piston 83 which under the action of a spring 84, is mounted in such a manner as to rock lever 73 against its spring 74, and to shut in this manner the plug 75 when, the worm-wheel 6 being liberated, roller 18 carried by arm 17 fixed on said wheel 6 releases contact with said arm 64.

The latter arm is then pushed back by spring 66 and brings the plug rod 69 which it carries into open position thereby allowing, when the brake cock 72 is opened, air to be admitted under piston 83. At the end of this stroke, lever 73 is unlatched by the engagement with the spring 66, of a stop projection 85 carried by the said lever.

The body of the auxiliary-gear valve 55, shown by Fig. 1, comprises two chambers: the one 86 is in communication on one side by the pipe 54 with the main canalization of the brakes, and on the other side by the pipe 56 with the nozzle 51 of the valve cup 50; the other chamber 88 is in communication through a pipe 81 with the opening 78 of the body 79.

The two chambers 86 and 88 are connected together by a canal 89 which is in communication, by a canal 90, with an air pump 91 the piston of which carries a needle 92 in front of a control strip 93 of the chronometrical tachometer 93a.

In the canal 89 there is also mounted a valve poppet 94 with a rod resting on a piston 95 which is movable in a chamber 88 and is destined to lift the valve poppet 94 and to allow admission of air from the brake canalization into the pump 91 to perforate the control strip 93 each time the piston 95 in the chamber 88 is lifted.

The various parts of the devices above described, the combination of which constitutes the safety apparatus according to this invention occupy the position shown in Fig. 1 when the train is stopped, as hand 1 is on the zero of the dial.

The control hand 3 having been placed by means of milled head screw 48 in front of the graduation on the same dial indicating the maximum speed allowable, it will be understood that while the train is running, hand 1 driven by a rotating member of the train, will progressively move towards hand 3, consistently with the acceleration of speed of the train, and will come back towards zero, whenever the speed of the train slackens down.

As long as the speed does not exceed the speed indicated by hand 3, the latter will not be in contact with hand 1 and the other parts of the device will remain in the position illustrated.

On the contrary if by thoughtlessness of the driver the speed did go higher than that indicated by hand 3, the outwardly curved end 3b of hand 3 (Fig. 2) is contacted by hand 1; therefore hand 3 will pivot around point 4, which will produce by means of the end 3a of the said hand, the angular displacement of lever 57, 60 pivotally mounted on the hand-support 5, and the opening of the valve 53 by longitudinal displacement of rod 61 and of pusher 62 (Figs. 2, 4 and 5).

Air from the canalization 54 of the brakes will consequently flow by 56, 51, 52 and 80 into the body 79 and by pipe 81 into the chamber 88 of valve 55, Fig. 1; piston 95 of the latter valve is lifted and opens poppet 94 which has for effect to produce the opening of the main canalization and to operate the brakes, also allowing air to enter by the pipe 90 into the pump 91 to perforate the control strip 93 and register the default of the driver, The speed of the train slackening down under the action of the brakes, the hand 1 will move away from the hand 3, the brakes canalization will shut and the feeding of the equalization valve of the brakes system will release the latter progressively.

When in normal running the train passes a stop signal connected to a track device which operates the electro-magnet 12 or a pneumatic device which sets pump 13 to work, the stop lever 10 of worm-wheel 6 is displaced by the said electromagnet or by the said pump and abandons the stop projection 9 integral with the worm-wheel.

The latter is set free, comes into contact with the screw 15 and accomplishes a complete revolution in driving cam 16 and arm 17. The roller 21 maintained in contact with cam 16 by the spring 22 comes progressively nearer to shaft 7, thereby producing through the sector shaped groove 23, a traction on the flexible tie 25, and consequently on the drum 27, whereby hand 3 is displaced towards the zero of the dial 2.

In other terms the hand 3 comes nearer to hand 1 and if the driver does not attend to reducing the speed, the hand 3 will contact with hand 1 and will determine operation of the brakes and perforation of the control strip 93 as has been explained.

At a given moment in the rotation of wheel 6, lever 64—65 is abandoned by roller 18 of arm 17 fixed with relation to the worm-wheel, and, being pushed back by spring 66, will pivot with the plug rod 68 which opens air admission 69 into the pump 70 (the stroke of the pump is limited to allow the spring 66 to be stopped exactly under the stop-projection 85) and puts the said pump in communication with the exhaust of the brake cock 72 by the conduit 71, Fig. 1.

By this arrangement, after the wheel 6 has been set free, if the driver operates the brake valve, he stops the train whilst the air lead under the piston 83 of pump 70 lifts the said piston against the spring 74 and pivots the lever 73.

The latter pushes back the plug 75 which shuts openings 77 and 78 of the valve body 79 and interrupts therefore communication between the nozzle 52 of the cup 50 and valve 55. The lever 73 is set in the position which it has been put in by piston 83, by means of the spring 86 which is engaged under stop-projection 85 of said lever 73.

In this position, the air admitted in conduct 80 by the opening of valve 53 cannot reach piston 95 so that valve 55 remains closed and pump 91 is not put in action. The control strip will not be perforated and the device thus described ensures automatic neutralization of the apparatus.

Towards the end of the revolution of wheel 6, the lever 17 brings the lever 64—65 back into the position shown in Fig. 1, this lever pushes back by means of its boss 67 the spring 66 which has for effect to liberate lever 73 which is set back by the spring 74 into the position shown in Fig.

1 and allows the opening of the plug 75 of valve 79. The plug 68 depending from arm 65 of lever 64—65 will shut again the admission canal 69 of pump 70 and the apparatus is automatically set in position for further operation.

At that instant operates the last control of the action of the driver: if the speed has fallen low enough, the hands 1 and 3 will no more be in contact, if on the contrary, the speed is not sufficiently reduced so that the train may stop at the desired point, the hands 1 and 3 will be in contact and will produce, as has been said, the automatic action of the brakes which will come into action to reduce the speed insufficiently reduced by the driver.

A manually operated pusher 73a will lift lever 73 which having a greater displacement than with the pump 70, will be caught under a spring 73b; the plug will shut, as already described, the communication between the nozzle 51 and valve 55; at the end of the revolution of wheel 6, the roller 18 pushes back the hook 73c and the lever 73 is again liberated; this optional neutralization is necessary in order that the train gains normal speed when the line has become free again before stopping.

When the apparatus is adapted to a train partially provided with continuous brakes, it is indispensable that the brakes act on a longer distance to allow stopping the train at the protected point.

With this object in view, a lever 96 Fig. 2, freely rotatable on axle 37 of drum 27 is provided with a roller 97 and a knob 98 which makes it possible to displace the said lever 96 and secure it at some point of a sector-dial 99.

During the displacement thereof concentrically to drum 27, the roller 97 pulls the flexible tie 25 and therefore makes it possible to bring hand 3 on the desired graduation of dial 2.

If in this position the wheel 6 is set free, hand 3 will immediately commence its movement towards the zero of the dial from the point where it has been adjusted and if the driver is not attending, the brakes will act automatically sooner.

In these conditions, the train provided with continuous brakes will stop in any case at the protected point. Lever 73 could also be displaced by hand against the action of its spring 74, by means of an appropriate knob; said lever 73 would then be hooked under a spring hook to ensure complete neutralization during the complete revolution of wheel 6. The spring hook is mounted in such a manner as to be disengaged automatically, by roller 18 of arm 17 depending from wheel 6, at the end of the revolution of the latter. The pump 31 is destined to control the pressure in the main canalization to which it is connected by pipe 42, as has been explained, branched on pipe 56 and valve body 55. When as shown in Fig. 1, the pressure in the main canalization is normal, the rod 29 of piston 30 of pump 31 is in contact with stop 34. When on the contrary a given depression exists in the main canalization, piston 30 of pump 31 is pushed back by its spring 33 and will also move the roller 26 mounted on the rod of the said piston.

This displacement of the roller has for effect to produce, by means of the flexible tie 25 passing over the said roller, a given angular displacement of the drum 27 to which is attached the tie 25 and to bring the hand 3 towards the zero of the dial.

Hand 3 therefore indicates, whatever is the position which it has to start from, the assigned speed limit to the train, on account of the depression in the canalization of the brakes. When this depression has become normal, the piston 30 of pump 31 and roller 26 come back to the position shown in Fig. 1, and hand 3 will be automatically brought back to the position which it had at the start, by the detent of spring 40, compressed during the preceding operation.

In the modification illustrated by Figs. 6 and 7, and which shows an optional neutralization device, the pivot 20 of lever 15 hitherto described carries a second lever 20a freely pivotally mounted and carrying a stop lever 20b one end of which is provided with a projection 20c which passes under a notch 19a of lever 19, which makes lever 20a dependent upon the downward movement of lever 19 when cam 16 operates a revolution in the direction of arrow X.

A pump 100, when air is sent under its piston, will repel lever 20b, the projection 20c of which is then disengaged from notch 19a, thus liberating lever 20a from lever 19. At that instant the spring 20d will return the lever 20a on the projection 20c and consequently the control hand 3 is brought back by means of the tie 25, onto the graduation 120 kilometers, which avoids its contact with the speed hand 1.

At the end of the revolution of cam 16, lever 19 lifts, by means of a cam projection 19b thereof, the projection 20c, of lever 20b; by compression of spring 20f lever 20b will be pushed back. Projection 20c therefore engages into notch 19a of lever 19 and makes lever 20a again dependent upon the downward movement of lever 19.

In the apparatus according to Fig. 1, the cam 16 has only one cam surface for operating lever 19 so that wheel 6, to which is secured the said cam and operating the latter after it (the wheel) is in engagement with the worm 15, can only rotate in a determined direction and the apparatus can in fact only be put in action when the engine on which it is mounted is running in a determined direction. Also the said wheel 6 and the cam 16 must accomplish a complete revolution, even if the control hand 3 has been brought back to zero after only half a revolution of the cam and wheel as has been described.

The modification according to Figs. 8 to 12 will ensure the functioning or rather the displacement of wheel 6 in both directions, whether the engine is in forward or in backward running.

Worm-wheel 6 has a helical toothing on the complete periphery thereof and is mounted on an axle 7 rigidly secured on an arm 10a suspended in such a manner as to be displaceable angularly around a pivot 101.

The arm 101a, which comprises at its lower end a slotted frame 102, concentrical to the axis of the pivot 101 and in which is engaged a screw 103, is on the other hand under the action of a spring 104 which will bring the said arm 101a into a position such that the latter will bear, in normal running of the train, against the screws 103 by the straight bottom of the slotted frame 102, and that the worm-wheel 6 which it carries will be on this account moved away from the worm 15 in continuous rotation by the chronometrical tachometer of the engine.

The wheel 6 is secured on a central axle 6a, which is adjusted with little friction on the axle 7, and carries, rigidly secured, a cam 16 having two similar cam surfaces 16a—16b and a portion 16c concentrical to the axis of shaft 7.

On the cam 16 rests, through a roller 21, a lever 19 which, pivotally mounted at one end on 20, is provided at its other end with a toothed sector shaped segment 105 which is permanently meshed with a pinion 106, which latter pinion is connected, by means of a suitable gear, with a pinion 107 (Fig. 11) replacing the drum 27 of the first described construction. This pinion 107 is connected to the arm 5, which carries the control hand 3 by means of the pivot 4.

The worm-wheel 6 is on the other hand connected to the arm 101a which carries it by means of a pinion shaped spring 108 engaged by one or several loops on the axle 6a of the said wheel 6 and between the two branches of wheel spring are engaged two blocks, one 109 secured in the arm 101a and the other 110 secured on wheel 6 (Figs. 8 and 9). By this arrangement, the device constituted by the worm-wheel 6 and the cam 16 is, in normal running when the said worm-wheel 6 is not in mesh with the worm 15, brought back and fixedly held on arm 101a in the position illustrated in Fig. 8.

The meshing of the said worm-wheel 6 with the screw 15 actuated by the chronometrical tachometer of the engine is operated automatically each time that, while running, the train passes in front of a stop signal connected to a track device set on the line and which operates either the closing of the circuit of an electro-magnet 111, or else the starting of a small pneumatic pump 112. The said meshing has for effect to produce simultaneously the motion of wheel 6 and of cam 16 which is fixed to the wheel, and to displace towards the zero of the dial the control-hand 3, by means of lever 19 actuated by cam 16 and by means of the sector shaped member 105 and of pinion 107 connected to arm 5 carrying pivot 4 of said control hand 3.

The two cam surfaces 16a—16b are arranged in such a manner that when wheel 6 is put in mesh with the worm 15 and rotated by the latter in either direction, according to the direction in which the engine runs, the lever 19 is displaced in one direction by the surface 16a and in the opposite direction by the second surface 16b, and thus brings the control hand 3 on the zero of the dial whatever be the direction in which the engine is running.

The number of teeth of wheel 6 is determined in such a manner that a complete revolution of the latter corresponds to a run of 2700 meters for the train, whereas the two cam surfaces 16a and 16b of the cam are conformed in such a manner that the control hand 3 is brought back to zero by lever 19 after a run of 1000 meters, the said lever and consequently hand 3 remaining in that position during 300 meters, while the portion 16c of the cam passes under roller 21 of the said lever.

The device destined to operate the engagement of wheel 6 with the screw 15, is each time the train passes a closed signal connected to a device on the line operating electro-magnet 111 or pump 112, also combined in such a manner to produce automatically the moving apart of wheel 6 from screw 15, after each half-revolution of the said wheel 6. This device, also illustrated in Figs. 8 to 10, comprises essentially a lever 113 which, pivotally mounted on axle 114, has its free end exactly above the pushrod of the piston 115 of a pump 112, and is also connected to the movable iron of electro-magnet 111, so that the said lever can be moved angularly by the piston of pump 112 or by the energizing of electro-magnet 111 and brought by one or the other of these devices into the position illustrated in Fig. 8.

On axle 114 is also pivotally mounted another lever which is in fixed relation to lever 113, is displaced by the latter and has two arms 116 and 117 which are arranged: the first in such manner as to push back against the spring 104 the arm 101a carrying wheel 6 and to bring the latter into engagement with screw 15; the second in such manner to maintain for an instant, as will be explained hereafter, lever 113 raised in the position of Fig. 8.

Referring now to this Fig. 8, one can see that arm 116 does not act directly on arm 101a, but does in fact through the means of a spring-peg 118 carried by the said lever 101a and arranged so that it ensures the resilient contact of the teeth of wheel 6 and of worm 15 when the teeth are not in true meshing position, and the operation of wheel 6 by worm 15 as soon the thread of the worm is exactly in mesh with the teeth of wheel 6.

Arm 101a occupying the position illustrated in Fig. 8, the lever 113 remains momentarily stuck in the position into which it has been brought by electro-magnet 111 or pump 112, by hooking on a tooth 119 formed at the end of a lever 120, of the arm 117 depending from lever 113 and from arm 116 applied against the spring peg 118.

That same arm 101a, is on the other hand held in the position shown by Fig. 8 by another lever 121, which is pivotally mounted on axle 114, and constitutes, by one end thereof, a bearing for a stop-screw 122, screwed at the end of lever 101a, and is normally brought back against the said stop 122 by a spring 123.

The lever 120, carrying the tooth 119 which is now dependent upon arm 116 and lever 113 is pivotally mounted on an axle 124 and is terminated at its end opposite to tooth 119 by two inclined planes 125 and 126. A spring 127 will have tendency to maintain the tooth 119 of lever 120 in mesh with arm 117. The worm wheel 6 carries on the other hand two pegs 128 and 129 which are disposed in such a maner that the first 128 will meet, in a certain direction of the rotation of the wheel, the inclined plane 125 of lever 120, and that the second 129 will meet in the opposite direction, the second inclined plane 126 of the said lever 120 which will therefore pivot on its axle 124 and will liberate, after a certain angular displacement of wheel 6 in one or the other direction, arm 117 fixed to arm 116 and to lever 113 and thereupon arm 101a which was only kept in the position of Fig. 8 by the stop-screw 122 abutting against the end of lever 121.

From this instant in the revolution of wheel 6, the driver can, by sending air under pressure into a small pump 130, produce the displacement of piston 131 in the said pump and therefore the rise against spring 123 of lever 121 which is maintained by the said spring in contact with the pusher-rod of said piston 131.

This pivotal movement of lever 121 has for effect to disengage it from stop 122, and therefore to liberate, arm 101a which, carrying wheel 6 and cam 16, is brought back under the action of the spring 104 thereof to the left on Fig. 8, by pivoting on axle 101, and by bringing therefore wheel 6 out of mesh with worm 15. Wheel 6 is therefore no longer under the action of the worm and is brought back into the position indicated in Fig. 8 by spring 108.

As a matter-of-fact, by this arrangement, the driver who is attending properly can still neutralize the full action of the apparatus, as soon as one or the other of pegs 128 or 129 has made the lever 120 pivot, and liberate therefore the assembly of levers 113—116.

If the driver does not proceed with this neutralization, the arm 101a carrying wheel 6 remains engaged with lever 121 by stop 122 and maintains therefore in mesh the wheel 6 and the worm 15. The wheel 6 continues by means of the worm 15 to be driven in one direction or in the other, until having performed half a revolution, a third peg 132 fixed on said wheel 6, comes into engagement with and obliges a lever 133 to pivot, said lever 133 being pivotally mounted in 134 on arm 101a. The lever 133, which is connected to the arm by means of a tongs or pincers shaped spring 135 maintaining the lever normally in the position shown in Fig. 8, ends at its bottom portion with a cam or bearing surface 136 which is arranged above the tail portion of lever 121, pushes the latter under the stop 122 liberating thereby arm 101a which is brought back by its spring 104, and displaces wheel 6 which being no longer in mesh with the worm 15, is brought back by the pincers shaped spring 108 into the position of Fig 8. Wheel 6 could, as shown in dotted lines in Fig. 8, comprise a notch 136a, or else a portion without teeth, disposed in a manner to correspond to the worm 15 at the end of each half revolution of wheel 6, to ensure in case of accident or injury or jamming of the disengaging device, the certainty of the disengagement of wheel 6 from the worm.

Of course during the half revolution imparted to wheel 6 by worm 15, arm 19 is displaced angularly by one or the other of cam faces 16a or 16b of the cam 16, according to the sense of rotation imparted to the said wheel 6, until the portion 16c of the said cam comes under roller 21 of said lever 19, and consequently when the hand 3, displaced by means of toothed sector 105, of pinion 106, of the gearing between pinion 106 and wheel 107, and of the device described with reference to Fig. 2 is brought back to zero.

The device illustrated in Fig. 11 of the drawing is the same as the one illustrated in Fig. 2 from which it differs only by the means used to allow to advance, according to requirements, the instant when the brakes must come in action so that a train provided with continuous brakes may stop at a desired point.

As will be seen on Figs. 11 and 12, the tubular shaft 35 and sleeve 37, which carry respectively the support 5 of the control-hand 3 and the pinion 107 operated by lever 19 of Fig. 8, are rotatably mounted in a fixed body 38a covered by a bell 47a, angularly displaceable by hand on the said fixed body and allowing to bring the control hand 3 in front of any one of the graduations on the dial of the apparatus, through the stop finger 46 and the springs 40 and 44 described with reference to Fig. 2.

The tubular member 35 carries, keyed or pinned at its rear end a crank arm 137 having the shape of a sector on which is secured by means of a spring blade 138, a wedge 139 the free end of which is maintained resiliently, by the said spring 138, in contact with the rear edge or rim of the fixed body 38. The latter has cut out from the rim thereof a mortising 140 extending on a certain portion of the periphery of the said rim and joined to said rim by inclines such as for instance 141 and 142. The said wedge 139, resting by its edge 139a on the uppermost part of the said rim of body 38a is thus maintained lifted above the pin 43, which produces as explained with reference to Fig. 2, the operation of axle 35 of control hand 3.

In this condition, the pin 43 will only act upon the said axle 35 when it has been displaced, by the rotation of axle 37 which carries it, in contact with the edge 137a of crank 137.

If on the contrary, by displacing by hand the bell 47a or the body 38a, in such a manner that the stop finger 46 of the said bell moves the crank 137 and the wedge 139 so that the latter falls in the mortising 140 of body 38a, the finger 43 depending from axle 37 revolved by wheel 107 as has been explained, will come against wedge 139 by its edge 139a and will produce, as will be understood by examining Fig. 12, the rotation of axle 35 much sooner than in the first case, in such a manner that the instant of the beginning of the control of the brakes will advance in adjustable manner, according to the initial adjustment of the wedge 139.

All the above described arrangements have been given, of course, by way of example, as the shapes, dimensions and materials constituting the parts, as well as constructional details may vary between wide limits as long as they remain within the scope of the following claims.

Having now fully described my said invention, what I claim and desire to secure by Letters Patent, is:

1. Control and safety device for railways and tramways, comprising in combination two hands rotatable in front of a dial, the one hand rotatable on a pivot and indicating at each instant the speed of the train on said dial, the other control hand, mounted on a support and adjustable by said support in front of a graduation of the said dial, being pivotable on said support by contact with the first mentioned hand to thereby open a valve, a wheel normally out of mesh with a chronometrical tachometer of the train, means set in action by a detent placed in any part of the line to set said wheel on mesh with said chronometrical tachometer, a flexible tie connecting a lever operated by a cam keyed on the axle of said wheel to said control-hand in such a manner that said control hand will be moved towards the zero of the dial when said wheel is set in action, a piston movable and equilibrated in a cylinder against the pressure in the main canalization of the brakes communicating to said cylinder, a roller carried by the rod of said piston and around which said flexible tie is guided whereby said control-hand will be displaced in front of said dial consistently with the pressure reigning in the main canalization of the brakes, independently of the position initially given to said control hand and independently of the functioning of said wheel and cam, a valve operated by a pivotally mounted lever when said wheel is set in action, a piston operated by the brake control of the driver and neutralizing said pivotally mounted lever when the driver operates the brakes, whereby said valves will stop operation of the relay valve.

2. Control and safety device for railways and tramways, comprising in combination two hands rotatable in front of a dial, the one hand being rotatable in front of a speed graduation to indicate at each instant the speed of the train, the other, control-hand, being pivotally mounted in front of the same graduation on a support rotatable on a tubular shaft in the axis of the pivot of the first mentioned hand, said tubular shaft being rotatable in a fixed support carrying a bell-shaped member rotatable by hand on said fixed support, adjustable in any position and connected to said control-hand to adjust same in front of a graduation of the dial, a cup-shaped member on the said bell-shaped member, connected with the main canalization of the brakes, connected to an auxiliary-gear valve and comprising a plug which is connected to said control hand support in such a manner that when said control hand comes into contact with the other hand, said plug opens communication between the main canalization of the brakes and the auxiliary gear valve to operate automatically the brakes and perforate a recording strip.

3. The apparatus of claim 2, in which the tubular shaft carrying the support of the control-hand contains a rod contacting by one end with the said plug, whereas the other end is in contact with one arm of a double-armed lever, the other arm of which is in contact with said control hand which by pivoting pushes said rod and opens said plug.

4. The apparatus of claim 1, in which a lever is fixed to the wheel set in action from the line, and forms bearing, when said wheel is at rest, for one arm of a double arm lever, the other arm of which is in contact with a spring and carries a plug which shuts, normally, the admission opening of a pump connected to the brakes control of the driver, said double arm lever being mounted in such a manner as to lose contact with said lever when said wheel is set in action to open said plug allowing neutralization of the apparatus by the control of the driver.

5. Control and safety device for railways and tramways, comprising essentially two hands rotatable upon the same axis in front of a dial, said hands being rotatable upon two distinct axles, the first, speed-controlling hand, being connected to a revolving part of the locomotive, and permanently indicating the speed of the train on corresponding graduations of the dial, the second, control hand, being movable manually in front of any graduation of the said dial to indicate the maximum permissible speed of the train, an unbalanced worm wheel mounted freely rotatable on a horizontal pivot, a notch in the periphery of said worm wheel, a stop projection on said worm-wheel normally in engagement with a lever operable by a detent on the line to produce disengagement thereof, and maintaining said worm-wheel with the notch in front of a worm rotated by the chronometrical tachometer of the engine, a cam keyed on the shaft of said worm-wheel, a pivotal lever resting by one end upon said cam and integral with a sector connected by a flexible tie to the control hand of the dial in such a manner that a detent on the line liberating the lever in engagement with said stop projection, said worm-wheel will fall in engagement with said worm and will move said control hand towards the zero of the dial, and means, connected to the main canalization of the brakes and acting upon said flexible tie to move said control-hand in the same sense, consistently with a depression in said canalization.

6. The apparatus of claim 5, comprising a lever pivotally mounted on the pivot of the lever resting upon the cam, and normally in engagement therewith, means for disengaging said levers, and means for automatically raising one of said levers, when disengaged from the first to bring the control-hand back again on the graduation of the speed limit.

7. Control and safety device for railways and tramways, comprising essentially two hands rotatable upon the same axis in front of a dial, said hands being rotatable upon two distinct axles, the first, speed-controlling hand, being connected to a revolving part of the locomotive, and permanently indicating the speed of the train on corresponding graduations of the dial, the second control-hand, being movable manually in front of any graduation of the said dial to indicate the maximum permissible speed of the train, an unbalanced worm wheel mounted freely rotatable on a horizontal pivot, a notch in the periphery of said worm wheel, a stop projection on said worm-wheel normally in engagement with a lever operable by a detent on the line to produce disengagement thereof, and maintaining said worm-wheel with the notch in front of a worm rotated by the chronometrical tachometer of the engine, a cam keyed on the shaft of said worm-wheel, a pivotal lever resting by one end upon said cam and integral with a sector connected by a flexible tie to the control hand of the dial in such a manner that a detent on the line liberating the lever in engagement with said stop projection, said worm-wheel will fall in engagement with said worm and will move said control hand towards the zero of the dial, means connected to the main canalization of the brakes and acting upon said flexible tie to move said control-hand in the same sense, consistently with a depression in said canalization, means operated by the contact of said control-hand with the other hand to open a valve in a pipe thereby allowing operation of a relay valve setting the brakes of the train, a lever keyed on the shaft of said worm-wheel and against which are normally abutting two pivotal levers, means operated by the brakes control of the driver and operating the first pivotal lever to shut communication in the said pipe and neutralize the apparatus, the second pivotal lever operating means for operating the said first pivotal lever by the control of the driver when the said worm-wheel has started revolution, means being provided to lock said first pivotal lever in position when the pipe is closed, and means operated by said second pivotal lever to unlock said first pivotal lever after the worm-wheel has come back in normal position.

8. The apparatus of claim 5, in which there is provided, freely rotatable on the shaft of the control-hand a lever which carries a roller adjustable with relation to said flexible tie and operable to displace the control-hand manually towards the zero of the dial and to produce operation of the brakes, sooner when the apparatus is set in action.

9. The apparatus of claim 1 in which the said cam comprises two identical cam surfaces disposed on either side of a portion concentrical to the axle of the cam and of the wheel and adapted to operate said control hand and move the same towards the zero of the dial in either sense of rotation of the wheel.

10. The apparatus of claim 1 in which the axle of the wheel and cam is supported by a pivotal lever and maintained normally by a spring in a position such that the wheel is not in mesh with the chronometrical tachometer, means being provided operated by a detent on the line to act upon said pivotal lever and bring the said wheel in mesh with the chronometrical tachometer.

11. The apparatus of claim 1 in which the axle of the wheel and cam is supported by a pivotal lever and maintained normally by a spring in a position such that said wheel is out of mesh with the chronometrical tachometer, a second pivotal lever being provided, operated by a detent on the line to act upon said first mentioned lever and against said spring to bring said wheel in mesh with said chronometrical tachometer, said second mentioned lever having a catch to maintain said wheel in mesh position, means being provided operated by said wheel to unlatch said catch after a determined revolution of said wheel.

12. The apparatus of claim 1 in which the axle of the wheel and cam is supported by a pivotal lever and maintained normally by a spring in a position such that said wheel is out of mesh with the chronometrical tachometer, a second pivotal lever being provided, operated by a detent on the line to act upon said first mentioned lever and against said spring to bring said wheel in mesh with said chronometrical tachometer, said second mentioned lever having a catch to maintain said wheel in mesh position, means being provided operated by said wheel to unlatch said catch after half a revolution of said wheel, and means operable by the driver to unlatch said catch in any position of said wheel and therefore neutralize the apparatus before complete action.

13. The apparatus of claim 1, in which the said wheel carries three stop projections, two of which operate respectively according to the sense of rotation of the wheel the disengagement of the said second pivotal lever after a determined rotation of said wheel, the said wheel remaining in position of mesh and being put out of mesh after a half-revolution by the third stop projection which unlatches the catch, the un-meshed wheel coming back automatically in normal position by the weight of the cam.

ELOI RODOLAUSSE.